United States Patent [19]

Hammond

[11] Patent Number: 5,263,116
[45] Date of Patent: Nov. 16, 1993

[54] HEATER FOR LIQUID

[75] Inventor: Brian W. Hammond, Norwich, United Kingdom

[73] Assignee: Heatrae Sadia Heating Limited, Norfolk, United Kingdom

[21] Appl. No.: 795,686

[22] Filed: Nov. 21, 1991

[30] Foreign Application Priority Data

Aug. 7, 1991 [GB] United Kingdom ............... 9117152

[51] Int. Cl.$^5$ ..................... H05B 1/02; F24H 1/20
[52] U.S. Cl. ..................... 392/451; 126/351
[58] Field of Search ................... 392/449–464; 126/361, 362, 351

[56] References Cited

U.S. PATENT DOCUMENTS

| 3,282,468 | 11/1966 | Karlem | 392/451 X |
| 3,422,745 | 1/1969 | Eisendrath | 392/451 X |
| 4,354,094 | 10/1982 | Massey et al. | 392/451 |
| 4,491,146 | 1/1985 | Sveds | 392/451 X |
| 5,019,690 | 5/1991 | Knepler | 392/449 X |

FOREIGN PATENT DOCUMENTS

| 2160681B | 12/1985 | Japan . |
| 8502590 | 4/1987 | Netherlands . |
| 302463 | 1/1955 | Switzerland . |
| 2076130 | 11/1981 | United Kingdom . |

Primary Examiner—Anthony Bartis
Attorney, Agent, or Firm—Spensley Horn Jubas & Lubitz

[57] ABSTRACT

A heater for liquid includes a vessel having an inlet for cold liquid and an outlet for hot liquid, an electrically operated valve means to control the flow of liquid into the vessel through the inlet, and an electric heating means to heat the liquid in the vessel. A first control means operative for controlling the liquid level in the vessel responds to a level sensor by maintaining the electrically operated valve means continuously open until the level of liquid in the vessel reaches an upper limit. The heater has a second control means operable independently from the first control means and which responds to a temperature sensor by rendering the heating means operative in response to a liquid temperature below a first threshold temperature being sensed, and inoperative in response to a liquid temperature above a second threshold temperature being sensed. The The rate of the continuous water inflow and the rate of heat delivery to the liquid being such that the temperature of the liquid does not fall substantally below the second threshold temperature.

8 Claims, 1 Drawing Sheet

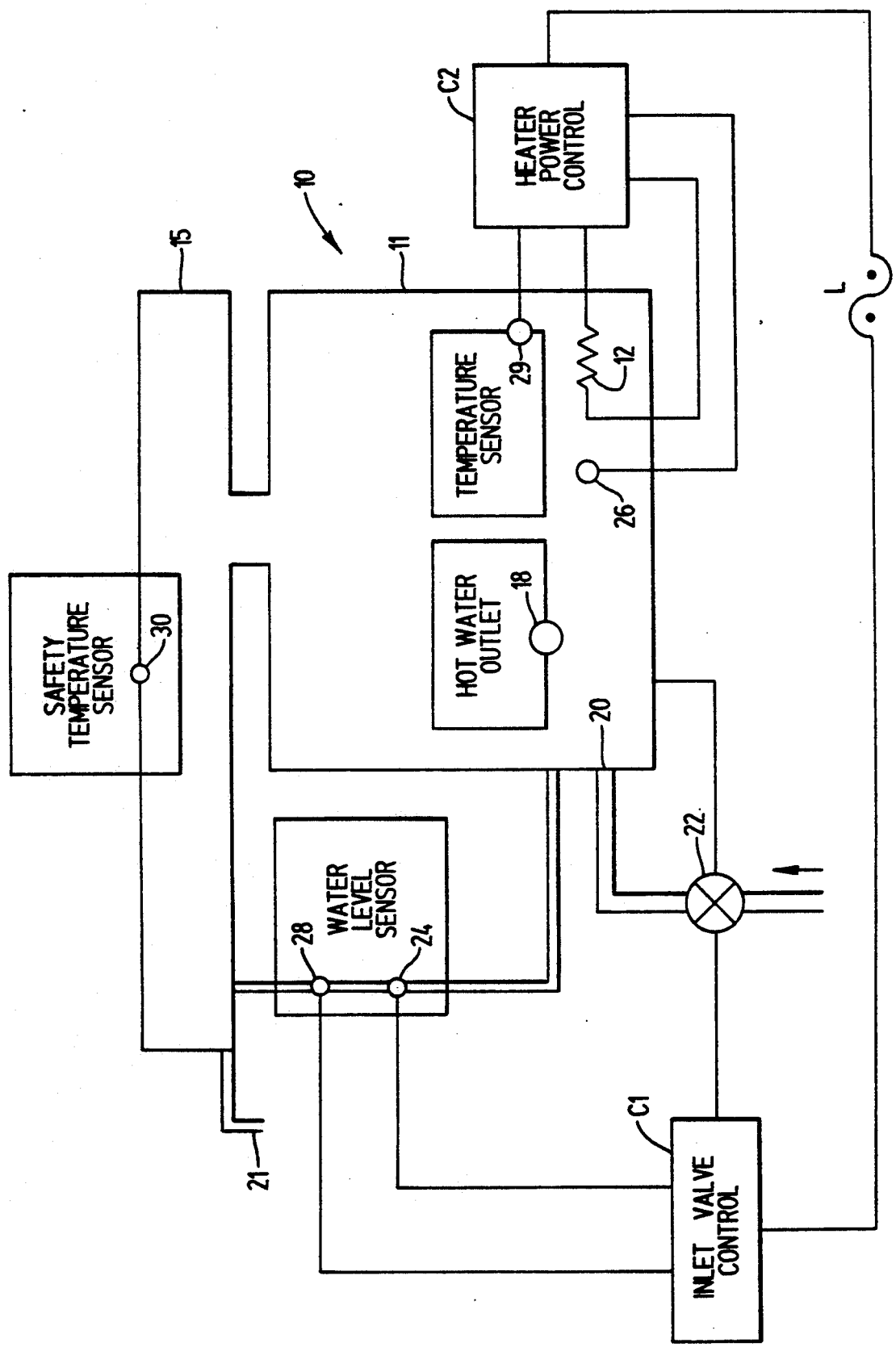

HEATER FOR LIQUID

BACKGROUND TO THE INVENTION

This invention relates to a heater for liquid.

SUMMARY OF THE INVENTION

According to one aspect of the invention, we provide a heater for liquid comprising a vessel having an inlet for cold liquid and an outlet for hot liquid. An electrically operated valve means is provided to control the flow of liquid into the vessel through the inlet, and a heating means is provided to heat the liquid in the vessel, thereby a first control means operative for controlling the liquid level in the vessel, which comprises a level sensor to which the first control means responds by maintaining the electrically operated valve means closed when the level of liquid in the vessel reaches an upper limit. The heater has a second control means, preferably operably independently from the first control means, the second control means including a temperature sensor to which the second control means responds by rendering the heating means operative when a temperature below a first threshold temperature is sensed, and inoperative when a temperature above a second threshold temperature is sensed; the control means are arranged such that when the level of liquid in the vessel is at the upper limit and the liquid is at a temperature above the second threshold temperature, when liquid is drawn off the electrically operated valve means permits the flow of liquid into the vessel substantially continuously until the level of liquid in the vessel again reaches the upper limit. The rate of inflowing liquid is such that the temperature of the liquid in the vessel, as sensed by the temperature sensor, does not fall substantially below the second threshold temperature.

By providing separate control means for operating the electrically operated valve and the heating means, a simple but reliable control for a heater for liquid is provided.

The electrically operated valve means may comprise a solenoid operated valve which is spring biased to a normally closed position, the solenoid when actuated moving a valve member of the valve means to an open position to permit liquid to flow through the valve into the vessel.

Preferably, the electrically operated valve permits the flow of liquid therethrough at a rate such that the temperature of the liquid sensed in the vessel, as sensed by the temperature sensor, does not fall substantially below the second threshold temperature, at least when steady state conditions are achieved, e.g. after the first fill cycle.

The liquid level sensor may comprise an electronic probe, the first control means being arranged to cause the electrically operated valve to close when the level sensor senses liquid at the upper limit.

The first control means may include a second liquid level sensor which is at a level below that of the first liquid level sensor, the first control means providing an indication to a user of the heater when the liquid level is below that of the second level sensor.

The or each liquid level sensor may sense the liquid level in a tube connected to the vessel such that the tube fills with liquid as liquid enters the vessel.

The temperature sensor of the second control means may comprise a mechanical bi-metal snap disc or strip, or an electronic device as required.

Although the first and second control means operate independently from one another to provide their control functions, the first and second control means may share a common power supply and may be provided on a common circuit board if desired.

The heater may comprise a safety sensor which is arranged upon sensing a temperature above normal operating temperature of the heater, to cut off the power supply to the heater. The safety sensor may again comprise a mechanical device such as a bi-metal snap disc or strip, or an electronic device as desired.

The safety sensor may be provided in a condenser chamber located above the vessel, hot vapour produced in the vessel as the liquid is heated passing into the condenser and impinging upon the safety sensor. The condenser may be vented from the heater and where a tube is provided which fills with liquid as liquid enters the vessel, the tube may open into the condenser.

The vessel may be insulated, and where a tube is provided, this may be insulated too to limit heat loss from the vessel and tube as the liquid is heated.

The heating means conveniently comprises an electrical heating element. Where a second level sensor is provided, preferably this is positioned above the level of the element and more preferably above the level of the outlet from the vessel.

The second control means may include an override means to allow a user initially to fill the vessel at least to a level above that of the heating element, or to the level of the outlet, before disabling the override means to permit the first and second control means to operate their control functions.

BRIEF DESCRIPTION OF THE DRAWINGS

The invention will now be described with reference to the accompanying drawing which is a schematic illustration of a heater in accordance with the invention.

DESCRIPTION OF THE PREFERRED EMBODIMENTS

Referring to the drawing, there is shown a heater 10 for liquid, in this example water, the heater 10 comprising a vessel 11 which may be insulated if required, there being an inlet 20 for cold water, and an outlet 18 for hot water, the outlet being connected to a tap (not shown) from where the hot water may be drawn from the vessel 11. A heating means comprising an electrical heating element 12 is provided to heat the water in the vessel.

The flow of water through inlet 20 into the vessel is via an electrically operated valve 22 which opens and closes in response to an appropriate signal from a first control means C1. For example, the valve 22 may be of the type which is spring biased to a normally closed position, the solenoid when actuated, moving a valve member of the valve to an open position to permit water to flow into the vessel 10.

A power supply to the heating element 12 is provided by a second control means C2.

The first control means C1 comprises a pair of level sensors 24 and 28, the sensors 24, 28, sensing the water level at their respective positions, in an insulated tube 23 which is connected to the vessel 11 so as to fill with water as the vessel 11 fills.

Level sensors 24 and 28 preferably each comprise an electronic probe, but alternative types of level sensors may be provided if desired.

Level sensor 24 is positioned just above the level of the outlet 18, (or at least above the level of element 12). The first control means C1 is arranged to respond to sensor 24 by indicating to a user of the heater when the water level is below that of the level sensor 28, whilst level sensor 28 is positioned where the maximum upper fill level of the vessel 11 is required.

The second control means C2 comprises a temperature sensor 29 to sense the temperature of the water above the level of the heating element 12, but at or below the level of the outlet 18.

The heater 10 also comprises an uninsulated condensing chamber 15 into which steam and hot water vapour from heated water in the vessel 11 can pass, the condenser 15 providing therethrough a vent.

The tube 23 in which the level sensors 24 and 28 sense the liquid level, is also vented into the condenser 15. The condenser 15 is vented via an overflow pipe 21 which also provides for the escape of water should the vessel 10 be overfilled for any reason.

Operation of the heater 10 will now be described.

The second control means C2 has an override facility to enable water initially to be introduced into the heater 10, at least to a level to cover the heating element 12 or to the level of outlet 18. The heating element 12 is preferably rendered inoperative during this operation, as hereinafter described.

With water at this level and the override facility disabled, the heater 10 can be commissioned. The solenoid valve 22 will be opened to allow more cold water into the vessel 11 and the heating element 12 will be energised.

The valve 22 is arranged to permit water to enter the vessel 10 at a controlled rate such that the heating element 12 can heat the inflowing water substantially instantaneously towards a first threshold temperature e.g. 99° C., without the temperature of the water in the vessel falling below a second lower, threshold temperature, at least when steady state conditions are achieved i.e. after the first fill cycle and when water in the heater has, upon initial turn-on, been heated to the first threshold temperature. When the level of water has reached the level of sensor 28, the valve 22 will be closed by the first control means C1.

The second control means C2 controls the heating element 12 entirely independently of the first control means C1 so that the heating element 12 will be de-energised whenever the temperature sensor 29 senses a temperature at or above a first threshold temperature and the second control means C2 renders the heating element 12 operative when a temperature at or above a second threshold temperature is sensed.

Hence heating element 12 will be energised by the second control means to heat the water in the vessel 11 whenever temperature sensor 29 senses "cold" and will be de-energised when sensor 29 senses "hot".

Thus filling is substantially continuous, the temperature of the water in the vessel 11 being maintained at or below the first threshold temperature, which may be for example, a temperature approaching boiling point e.g. 99° C. but at or above the second threshold temperature which is preferably only a few degrees lower, when steady state conditions have been achieved. When the liquid reaches the level of sensor 28 the first control means C1 will maintain the valve 22 in a closed condition until the water level falls, or hot water is drawn off.

If no hot water is drawn off, the heating element 12 will thus cycle on and off as the temperature sensor 29 senses cold and hot respectively so that the temperature in the vessel at the upper level limit of sensor 28, is maintained between the first and second threshold temperatures.

As soon as hot water is drawn off through the outlet 18, the sensor 28 will no longer sense the presence of liquid at the full level of the vessel 11 and accordingly, the solenoid valve 22 will be opened to allow more cold water into the vessel. Refilling will continue at the controlled rate until the level of the liquid again reaches the level of sensor 28.

In one arrangement, the electronic probes 24,28, of the first control means C1 are connected to inputs of comparator devices of an electronic circuit, or to electronic bridges or other balancing means so that as soon as water reaches the level of the respective sensors 24,28, the presence of the water will be detected.

Temperature sensor 29 may comprise a mechanical device such as a bi-metal snap disc, strip, or another mechanical device, or an electronic device as required.

Within the condenser 15 there is preferably provided a first safety sensor 30 which is arranged to cut off the power supply to the heater 10 as a whole, irreversibly, should the temperature sensor 30 sense a temperature above a maximum safety temperature. Thus in the event of the failure of either of the control means C1,C2, the water in the vessel cannot be overheated.

A second safety device 26 is provided which comprises a thermostatic sensor positioned in close proximity to the heating element 12. Thus on initial filling of the vessel and in the event that the water level falls below the level of element 12, such that element 12 is no longer entirely covered with water, the electrical supply at least to the element 12 is disrupted.

However, to protect against element 12 being uncovered, the outlet 18 is provided above the level of the element 12.

The electrically operated valve 22 is preferably of the type which is normally maintained in a closed condition and is only opened when the valve receives an electrical signal.

As shown in the drawings, a power supply L is connected to each of the control means C1 and C2. It will be appreciated that although the control means C1 and C2 operate entirely independently from one another, they may share a common power supply as indicated in the drawings and/or may be provided on a common circuit board if desired. The supply may be a high voltage supply with each of the control means C1 and C2 having their own transformer means, or a low voltage supply with each of the control means C1 and C2 controlling a high voltage supply to operate respectively the solenoid valve 22 and the heating element 12.

An alternative safety device to providing a temperature sensor 30 within the condenser chamber 15 could be provided. Preferably though, where the temperature sensor is provided in the condenser chamber 15, the chamber is uninsulated, so that the steam and hot vapour from the water in the vessel readily condense onto the inside surface of the condenser chamber 15.

I claim:

1. A heater for liquid comprises a vessel having an inlet for cold liquid and an outlet for hot liquid, an electrically operated valve means to control the flow of liquid into the vessel through the inlet, and a heating means to heat the liquid in the vessel, first control means operative for controlling the liquid level in the vessel, the first control means comprising a level sensor to which the first control means responds by maintaining the electrically operated valve means closed when the level of liquid in the vessel reaches an upper limit, the heater having a second control means including a temperature sensor to which the second control means responds by rendering the heating means operative when a temperature below a first threshold temperature is sensed, and inoperative when a temperature above a second threshold temperature is sensed, wherein when liquid is drawn off, the electrically operated valve means permits the flow of liquid into the vessel substantially continuously until the level of liquid in the vessel again reaches the upper limit, the rate of inflow and the rate of delivery of heat from the heating means to liquid in the vessel being such that the temperature of the liquid in the vessel, as sensed by the temperature sensor, does not fall substantially below the second threshold temperature.

2. A heater according to claim 1 wherein the electrically operated valve means comprises a solenoid operated valve which is spring biased to a normally closed position, the solenoid when actuated, moving a valve member of the valve means to an open position to permit liquid to flow through the valve into the vessel.

3. A heater according to claim 1 wherein the liquid level sensor comprises an electronic probe, the first control means being arranged to cause the electrically operated valve means to close when the level sensor senses liquid at the upper limit.

4. A heater according to claim 1 wherein the first control means includes a second liquid level sensor which is at a level below that of the first mentioned liquid level sensor, the first control means providing an indication to a user of the heater when the liquid level is below that of the second level sensor.

5. A heater according to claim 1 wherein the heater comprises a safety sensor which is arranged upon sensing a temperature above normal operating temperature of the heater, to cut off the power supply to the heater.

6. A heater according to claim 5 wherein the safety sensor is provided in a condenser chamber located above the vessel and in communication with the vessel, hot vapour produced in the vessel as the liquid is heated passing into the condenser chamber and impinging upon the safety sensor.

7. A heater according to claim 1 wherein the second control means includes an override means to allow a user initially to fill the vessel at least to a level above that of the heating means and wherein the override means is disabled to permit the first and second control means to operate their control functions.

8. A heater according to claim 1, wherein the second control means is operable independently from the first control means.

* * * * *